United States Patent
Lang et al.

(10) Patent No.: US 10,701,866 B2
(45) Date of Patent: Jul. 7, 2020

(54) DRIVE SYSTEM FOR INTERMITTENT ROTATION OUTPUT

(71) Applicant: Deere & Company, Moline, IL (US)

(72) Inventors: Eric R. Lang, Newhall, IA (US); Darin L. Roth, Batavia, IA (US)

(73) Assignee: DEERE & COMPANY, Moline, IL (US)

(*) Notice: Subject to any disclaimer, the term of this patent is extended or adjusted under 35 U.S.C. 154(b) by 92 days.

(21) Appl. No.: 16/155,171

(22) Filed: Oct. 9, 2018

(65) Prior Publication Data

US 2019/0116735 A1    Apr. 25, 2019

Related U.S. Application Data

(60) Provisional application No. 62/576,997, filed on Oct. 25, 2017.

(51) Int. Cl.
*F16D 11/14*    (2006.01)
*F16D 23/12*    (2006.01)
(Continued)

(52) U.S. Cl.
CPC .......... *A01F 15/0858* (2013.01); *A01D 59/04* (2013.01); *A01D 69/002* (2013.01);
(Continued)

(58) Field of Classification Search
CPC ...... A01F 15/0858; A01F 15/00; A01F 15/04; A01F 2015/0866; F16D 11/14;
(Continued)

(56) References Cited

U.S. PATENT DOCUMENTS 2,566,054 A    8/1951   Burkett
2,667,252 A    1/1954   Maybach
(Continued)

FOREIGN PATENT DOCUMENTS

DE    102008049978 A1    1/2010
EP       0933018 A2       8/1999
(Continued)

OTHER PUBLICATIONS

Partial European Search Report for application No. 18201577.6 dated Jun. 19, 2019.
(Continued)

*Primary Examiner* — David J Hlavka
(74) *Attorney, Agent, or Firm* — Klintworth & Rozenblat IP LLP

(57) ABSTRACT

An intermittent drive system includes a rotatable output component, a rotating input component with a driving engagement element, a synchronizing ring and a decoupling ring. The synchronizing ring is coupled to the output element to rotate therewith. The synchronizing ring has a driven engagement element configured to selectively engage with the driving engagement element. The synchronizing ring has an alignment feature configured to rotationally align the driving engagement element with the driven engagement element and has a decoupling feature configured to selectively disengage the driving engagement element from the driven engagement element. The decoupling ring is selectively coupled to the input component and has a decoupling feature configured to selectively engage the decoupling feature of the synchronizing ring. The driving engagement element engages the driven engagement element only when both the alignment feature is rotationally oriented to align the driving engagement element with the driven engagement element and the decoupling features are rotationally oriented (Continued)

to allow the driving engagement element to engage the driven engagement element.

20 Claims, 6 Drawing Sheets

(51) Int. Cl.
*A01F 15/08* (2006.01)
*A01F 15/04* (2006.01)
*B65B 13/26* (2006.01)
*F16H 55/20* (2006.01)
*A01D 59/04* (2006.01)
*A01D 69/00* (2006.01)
*B60K 17/28* (2006.01)
*F16D 43/26* (2006.01)
*F16D 43/202* (2006.01)
*A01D 69/08* (2006.01)
*A01F 15/00* (2006.01)

(52) U.S. Cl.
CPC ............. *A01D 69/08* (2013.01); *A01F 15/00* (2013.01); *A01F 15/04* (2013.01); *B60K 17/28* (2013.01); *B65B 13/26* (2013.01); *F16D 11/14* (2013.01); *F16D 43/2024* (2013.01); *F16D 43/26* (2013.01); *F16H 55/20* (2013.01); *A01F 2015/0866* (2013.01); *F16D 2023/123* (2013.01)

(58) Field of Classification Search
CPC ..... F16D 43/2024; F16D 43/26; A01D 69/08; A01D 69/002; A01D 59/04; B60K 17/28; F16H 55/20; B65B 13/26; B60Y 2200/22; B60Y 2200/221

See application file for complete search history.

(56) References Cited

U.S. PATENT DOCUMENTS

| | | | |
|---|---|---|---|
| 2,869,697 | A | 1/1959 | Tiltman Langley Ltd |
| 4,771,872 | A | 9/1988 | Kampf |
| 8,584,785 | B2 | 11/2013 | Marsh et al. |
| 9,302,581 | B1 | 4/2016 | Valente |
| 2011/0036679 | A1 | 2/2011 | Kampf et al. |
| 2013/0199884 | A1* | 8/2013 | Eder ..................... F16D 11/14 192/69 |
| 2013/0240317 | A1* | 9/2013 | Mori ..................... F16D 11/14 192/69.8 |
| 2013/0334000 | A1* | 12/2013 | Gerauer ................. F16D 11/14 192/69.7 |
| 2014/0248172 | A1* | 9/2014 | Nagano ................. F04C 27/005 418/55.4 |
| 2015/0298543 | A1 | 10/2015 | Downs et al. |
| 2016/0040726 | A1* | 2/2016 | Shiotsu .................. F16D 11/14 74/333 |
| 2016/0081277 | A1 | 3/2016 | Kraus et al. |
| 2018/0335093 | A1* | 11/2018 | Choi ....................... F16D 23/06 |

FOREIGN PATENT DOCUMENTS

| | | |
|---|---|---|
| EP | 2830409 A1 | 2/2015 |
| GB | 839554 A | 6/1960 |
| GB | 1537127 A | 12/1978 |
| GB | 2169972 A | 7/1986 |
| WO | 2012145580 A1 | 10/2012 |

OTHER PUBLICATIONS

European Search Report issued in counterpart European Patent Application No. 18201577.6 dated Oct. 17, 2019 (16 pages).

* cited by examiner

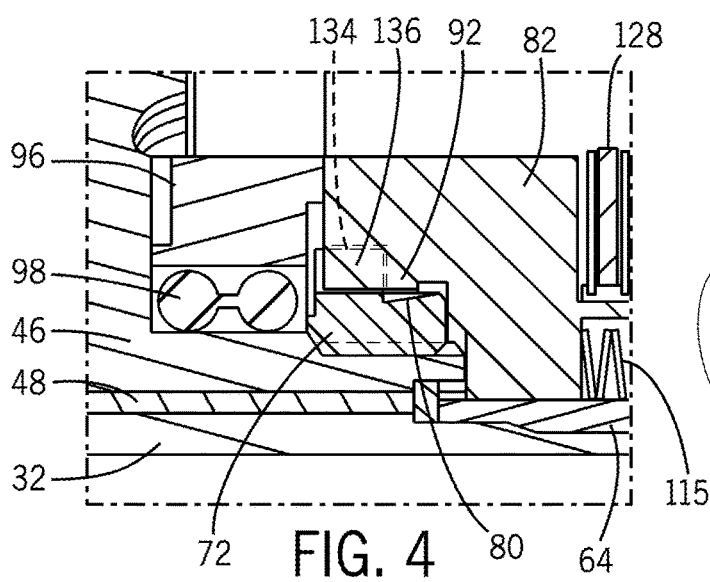
FIG. 4
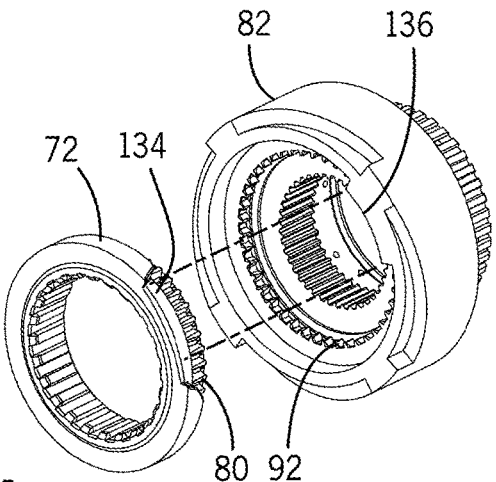
FIG. 4A
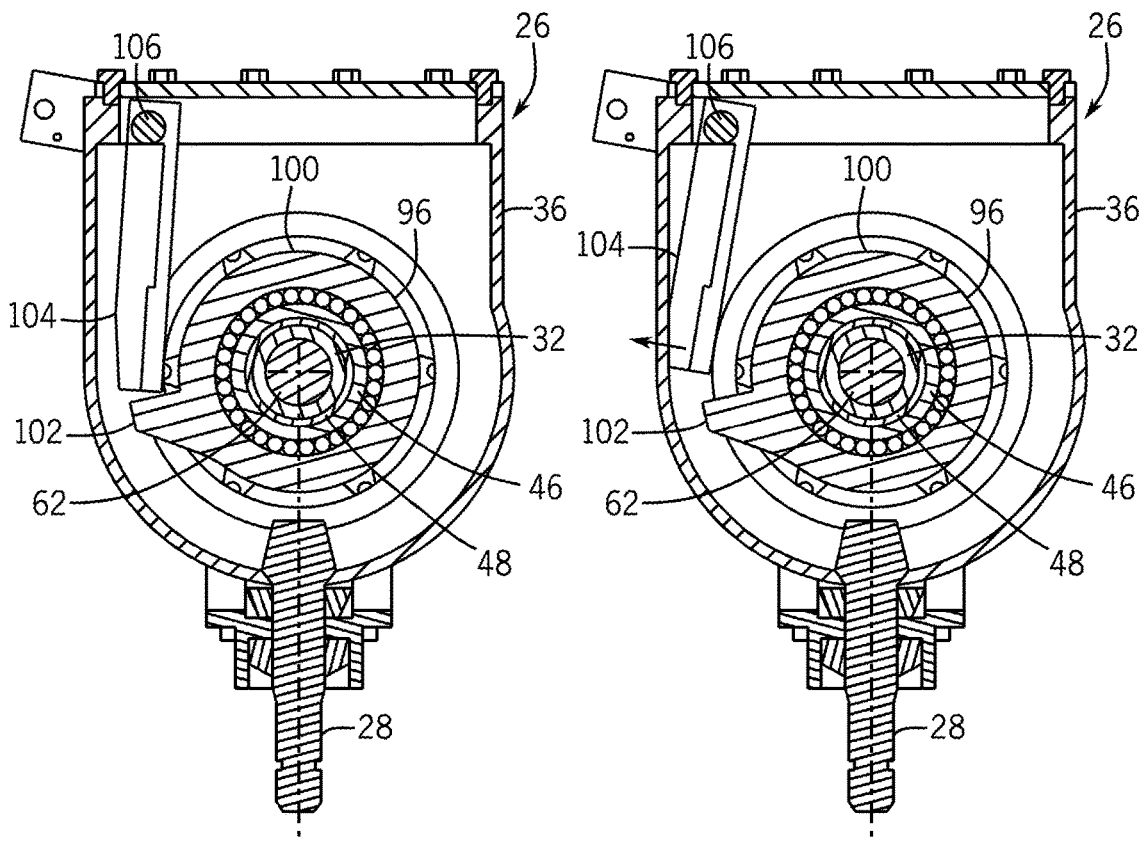
FIG. 5
FIG. 6

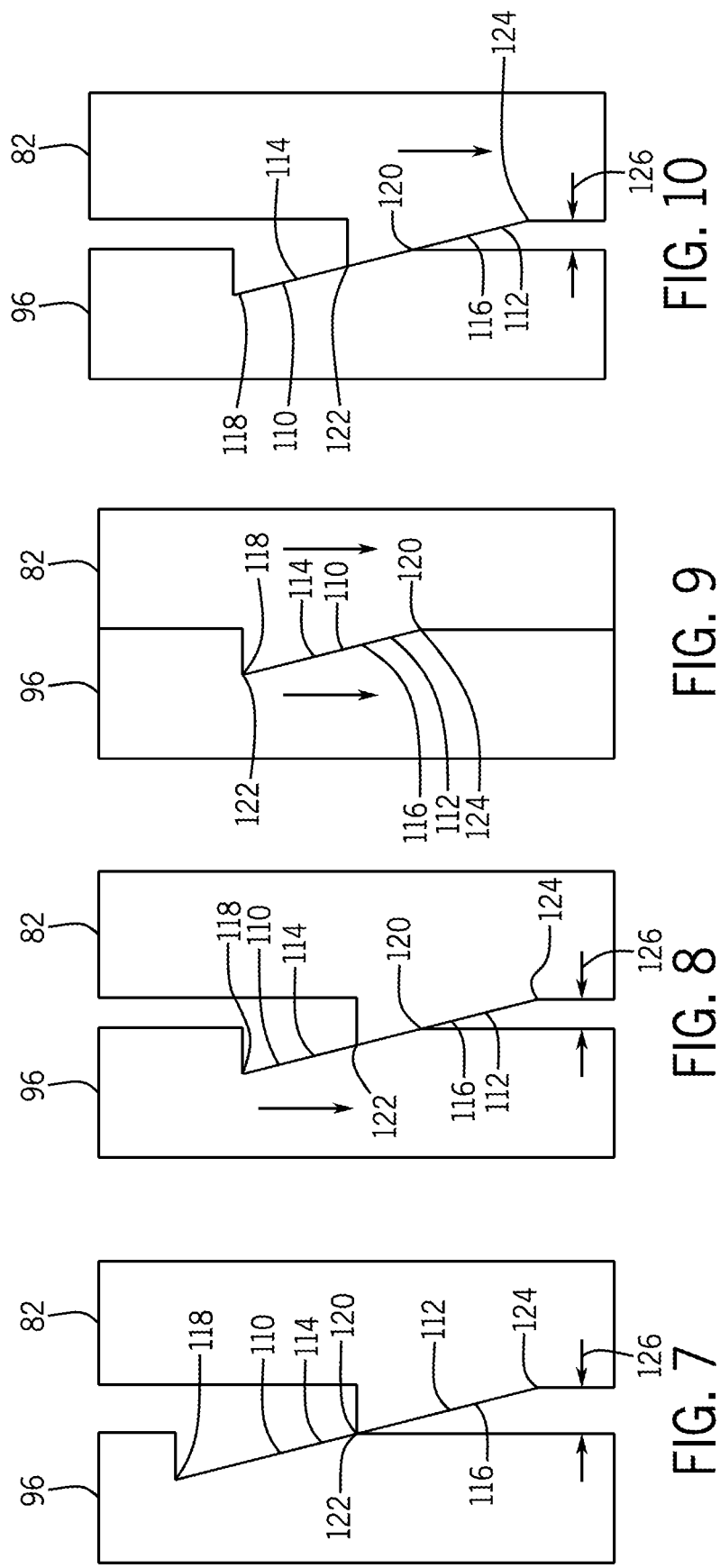

DRIVE SYSTEM FOR INTERMITTENT ROTATION OUTPUT

CROSS-REFERENCE TO RELATED APPLICATION(S)

This application claims priority to U.S. provisional application No. 62/576,997, filed Oct. 25, 2017.

STATEMENT OF FEDERALLY SPONSORED RESEARCH OR DEVELOPMENT

Not applicable.

FIELD OF THE DISCLOSURE

This disclosure relates to drive systems, and to drive systems for machine power applications where rotational power is intermittently required.

BACKGROUND OF THE DISCLOSURE

Various machine power applications may include drive systems where rotational power is intermittently required for a single rotation. In certain applications, the drive system output operates through a cycle that begins and ends at the same rotational position. Examples of machines that may include this type of drive include various work vehicles and implements used in the agricultural industry, such as baler knotter drives, feed system drives, indexing drives, drives for forming machines, drives for fastening operations, and drives for other applications.

SUMMARY OF THE DISCLOSURE

The disclosure provides a drive system for intermittent output, including for single rotation output.

In one aspect, the disclosure provides an intermittent drive system that includes a rotatable output component, a rotating input component with a driving engagement element, a synchronizing ring and a decoupling ring. The synchronizing ring is coupled to the output element to rotate therewith. The synchronizing ring has a driven engagement element configured to selectively engage with the driving engagement element. The synchronizing ring has an alignment feature configured to rotationally align the driving engagement element with the driven engagement element and has a decoupling feature configured to selectively disengage the driving engagement element from the driven engagement element. The decoupling ring is selectively coupled to the input component and has a decoupling feature configured to selectively engage the decoupling feature of the synchronizing ring. The driving engagement element engages the driven engagement element only when both the alignment feature is rotationally oriented to align the driving engagement element with the driven engagement element and the decoupling features are rotationally oriented to allow the driving engagement element to engage the driven engagement element.

In another aspect, the disclosure provides an intermittent drive system includes an input element is driven to rotate. A decoupling ring is selectively rotatable with the input element and has a ramped surface. An output element is alternatively coupled with the input element to rotate therewith or is decoupled from the input element via a synchronizing ring. The synchronizing ring has a ramped surface facing the ramped surface of the decoupling ring. A trigger holds the decoupling ring from rotating and is actuated to release the decoupling ring to rotate with the input element. The ramped surfaces operate to disengage the synchronizing ring when the trigger holds the decoupling ring from rotating, thereby decoupling the output element from the input element. The synchronizing ring slides toward the decoupling ring when the trigger is actuated, so that the output element is coupled to rotate with the input element.

The details of one or more embodiments are set forth in the accompanying drawings and the description below. Other features and advantages will become apparent from the description, the drawings, and the claims.

BRIEF DESCRIPTION OF THE DRAWINGS

FIG. 4 is a fragmentary view of an engagement element area 4-4 of the drive unit of FIG. 3 in a coupled state;

FIG. 4A is a perspective view of showing alignment features of certain components of the drive system of FIG. 1;

FIG. 5 is a cross section illustration of the drive unit taken along line 5-5 of FIG. 3, showing the trigger engaged with the decoupling ring;

FIG. 6 is a cross section illustration of the drive unit taken along line 5-5 of FIG. 3 showing the trigger disengaged from the decoupling ring;

FIG. 7 is a schematic illustration of a decoupling ring and synchronizing ring ramp area 7-7 of the drive unit of FIG. 3 in a decoupled state;

FIG. 8 is a schematic illustration of a decoupling ring and synchronizing ring ramp area 7-7 of the drive unit of FIG. 3 in a coupling state;

FIG. 9 is a schematic illustration of a decoupling ring and synchronizing ring ramp area 7-7 of the drive unit of FIG. 3 in a coupled state; and FIG. 10 is a schematic illustration of a decoupling ring and synchronizing ring ramp area 7-7 of the drive unit of FIG. 3 in a decoupling state.

Like reference symbols in the various drawings indicate like elements.

DETAILED DESCRIPTION

The following describes one or more example embodiments of a disclosed drive system, as shown in the accompanying figures of the drawings described briefly above. Various modifications to the example embodiments may be contemplated by one of skill in the art.

In one or more example implementations of the disclosed drive system intermittent output is provided, including for applications requiring single rotation output. Generally, the disclosed systems provide improved drive action with timed operation and drive disengagement through a "soft" release. In certain embodiments, a single rotation is timed to a distinct machine action of the application within which the drive system operates, where the distinct action is interconnected with a drive unit through an actuator. In certain embodiments, the soft release is provided to smoothly disengage elements under a heavy load. By providing a soft release, engaged components may be disengaged without generating impact shocks or force swings.

The following description relates to a synchronizer clutch, and a drive system in which in the synchronizer clutch is used, described in the context of a baler knotter system application, for purposes of demonstrating an example. In a baler knotter system, a drive system with an intermittent, single rotation output is useful to tie knots securing each bale that is produced. The present disclosure is not limited to baler knotter system applications, but rather, also encompasses any application where intermittent output is desired, including where a timed single rotation output is required. Accordingly, the teachings of the present disclosure can be applied to drive systems in a variety of applications, including those where intermittent output varies from a single rotation, when desired.

In the example of the present disclosure as further described below, a drive system generally includes an input element configured to rotate, where the rotation may be substantially continuous. An output element is alternatively coupled with the input element to rotate therewith or decoupled from the input element to not rotate therewith. It should be appreciated that rotation of the output element may be at a different rotational speed than rotation of the input element, and in various examples may be at a slower speed in comparison. Through the drive system, the output element is intermittently driven as a timed drive shaft for the given application. In some examples, when the output element is decoupled from the input element, a brake may be employed to hold the output element and its connected components in position.

Figure 1:
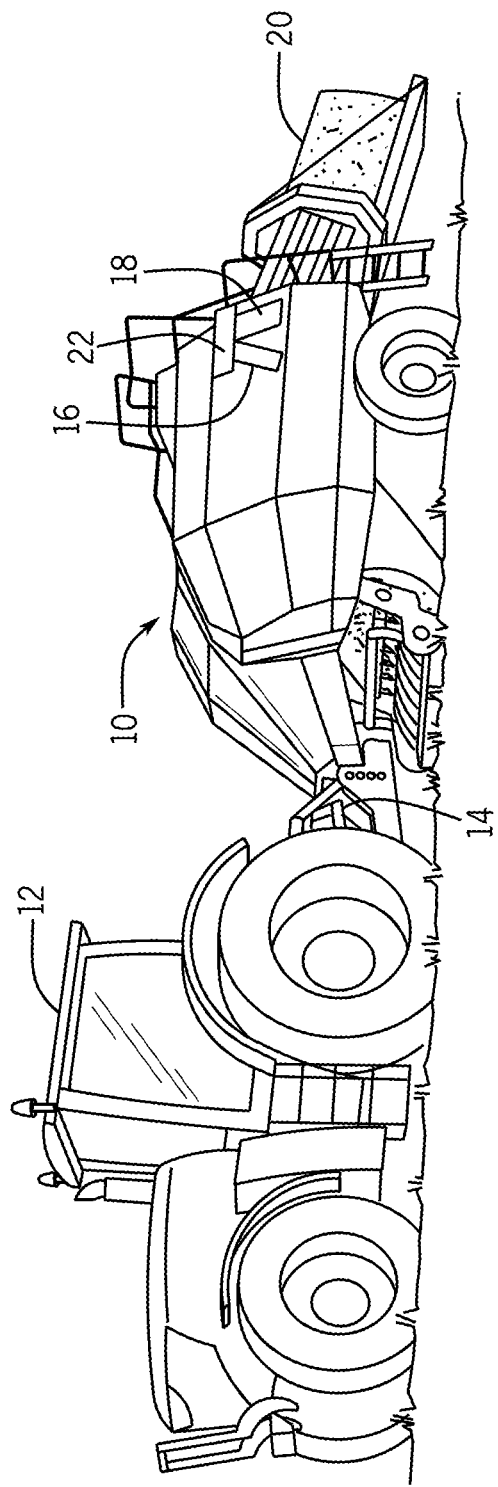
FIG. 1 is a perspective view of an example drive system application in the form of a baler towed by an agricultural tractor.

As noted above, the drive system described herein may be employed in a variety of applications. Referring to FIG. 1, one example involves a baler 10 that may be towed by a work vehicle, such as a tractor 12. Various other propulsion configurations are also possible for the baler 10. In the current example, the tractor 12 includes a propulsion source that also drives a rotating power take off (PTO) 14 that is used to power systems of the baler 10. In general, the baler 10 gathers loose material, such as cut crop material, and forms bales that are compacted by a plunger mechanism 16. Once an individual bale 20 has been formed, a knotter assembly 18 of the baler 10 is then utilized to tie the formed bale 20 with twine or other material before the bale 20 is ejected from the baling chamber. The knotter assembly 18 is driven through bale tying cycles by a drive system 22 that provides a single rotation output. Because the bales are individually completed, the knotter assembly 18 is driven intermittently, when a bale 20 is completely formed. The drive system 22 is timed to provide the required single rotation output in concert with cycling of the plunger mechanism 16 and includes an actuator 24 to trigger the drive system 22 to provide the required output. For example, the location of the plunger mechanism 22 when a full bale 20 is produced, is used to initiate the drive system 22 to drive the knotter assembly 18. It will be appreciated that the components of the baler 10 may be large, heavy and relatively slow moving. Accordingly, the drive system 22 accommodates this type of components in providing the transmission of intermittent power to drive the knotter assembly 18, once for each bale formed by the baler 10.

Figure 2:
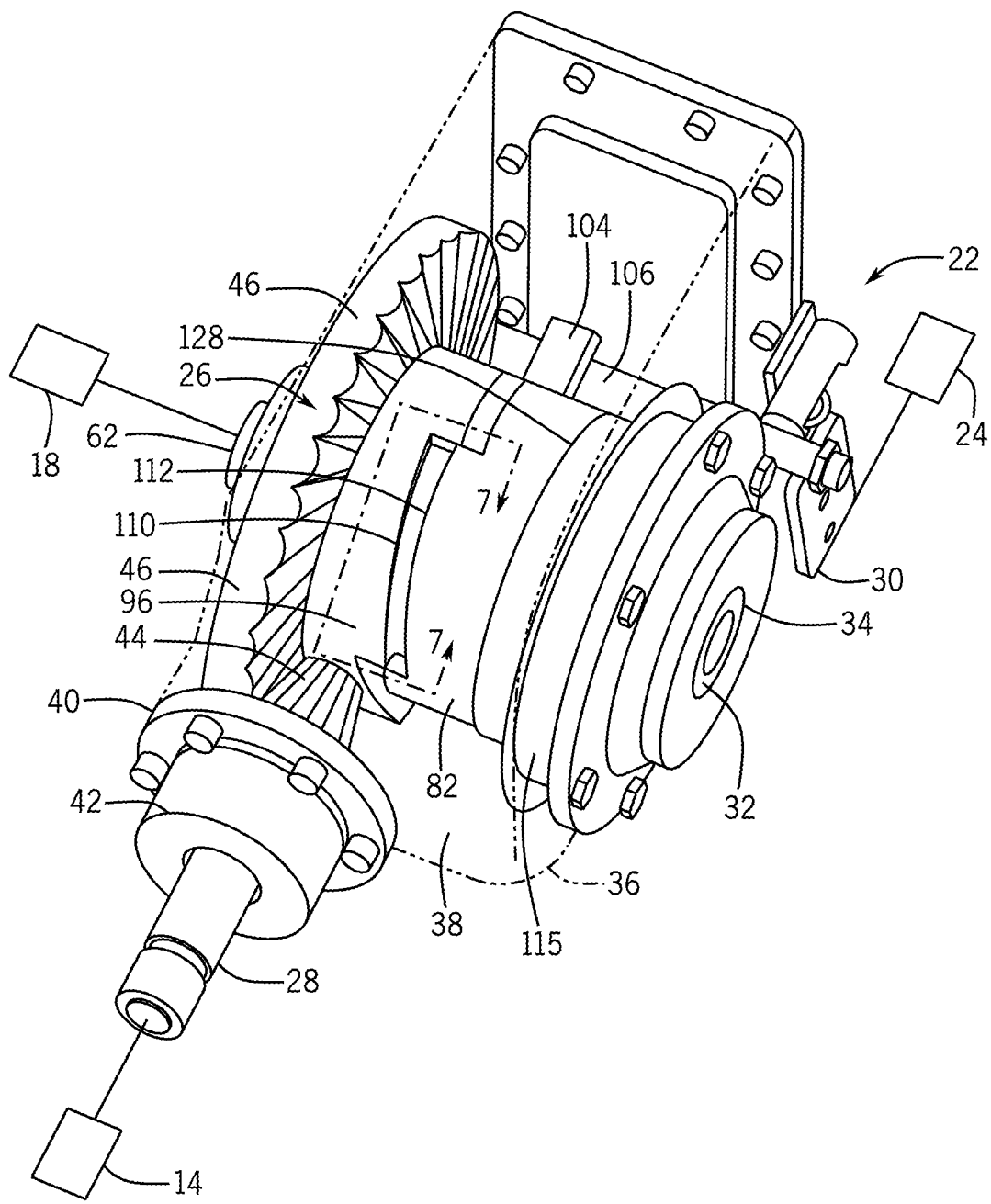
FIG. 2 is a perspective view of a drive unit of the drive system of FIG. 1, with the case broken away for visibility.

In various embodiments, as illustrated in FIG. 2, the drive system 22 includes a drive unit 26. In general, the drive unit 26 includes one or more components providing input power that are intermittently coupled to one or more components that receive and output power. In the illustrated example, an input element 28 is coupled with a power source such as the PTO 14, an actuator arm 30 coupled with an operator such as the actuator 24, and an output element 32 coupled with a driven mechanism such as the knotter mechanism 18. Through the drive unit 26, rotational power is intermittently transferred from the input element 28 to the output element 32 in a selected rotational amount, in response to actuation of the actuator arm 30. In the current example, the output element 32 rotates through a single rotation as the selected rotational amount, in response to an actuation of the actuator arm 30. In the example, rotation of the output element 32 begins and ends at the same rotational position 34. The actuator 24 may be any of a number of types of actuators configured to move the actuator arm 30 in time with the synched operation. For example, in the baler 10 application, the plunger mechanism 16 sets the cadence of the drive system 22. The actuator 24 is synched to move the actuator arm 30 in time with a stroke of the plunger mechanism 16. This provides a tying operation of the knotter mechanism 18 for each bale 20 produced by the baler 10. The actuator 24 may be operated through a mechanical linkage with the plunger mechanism 16, or through an electrical, pneumatic, hydraulic or other driving mechanism timed with the plunger mechanism 16. Timing may be accomplished through a mechanical link, timed teeth, electronic logic, or another method. The input element 28 is a rotating element, which in a number of variations may be a gear, sprocket, pulley, shaft, or other structure configured to connect the drive unit 26 with the application's power source, and to transmit power and motion into the drive unit 26. In the current example the input element 28 is an input shaft, and more specifically, a solid input shaft that is generally cylindrical in shape. Similarly, the output element 32 is a rotating element, such as a gear, sprocket, pulley, shaft, or other structure configured to connect the drive unit 26 with the application's driven device and to transmit power and motion out of the drive unit 26. In the current example the output element 32 is an output shaft, and more specifically, a hollow output shaft that is generally a hollow cylinder in shape. The output element 32 may couple to one or more additional output components, which in the context of the baler example disclosed herein may be a knotter shaft 62.

Figure 3:
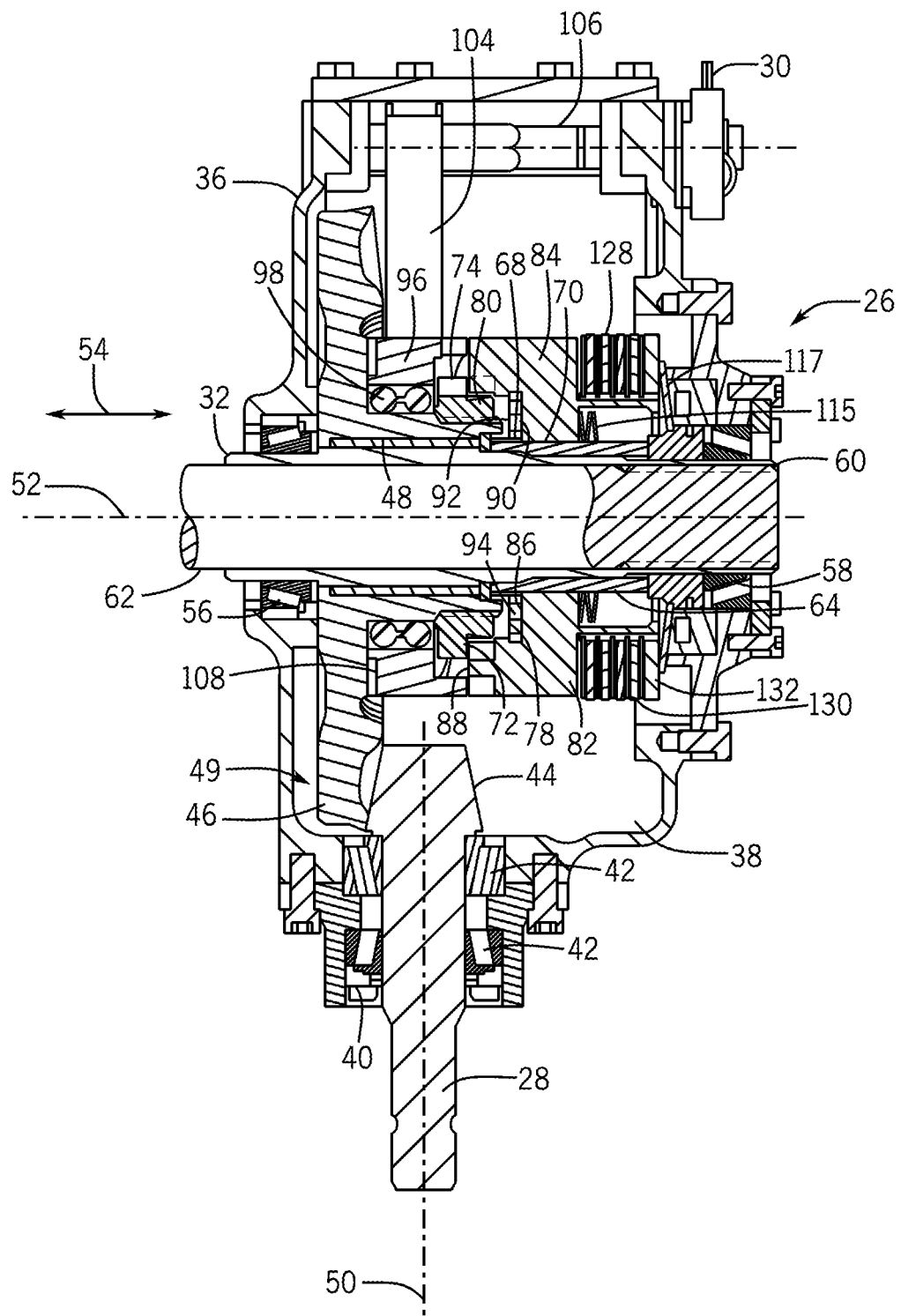
FIG. 3 is a cross sectional illustration of the drive unit taken along line 3-3 of FIG. 2, in a decoupled state.

With additional reference to FIG. 3, the drive unit 26 includes a case 36 enclosing various components of the drive system 22 for protection and providing a lubricating oil reservoir 38 within which the internal components are set. The input element 28 extends through an opening 40 in the case 36 and is rotationally supported on the case by bearings 42. Inside the case 36 a gear, in the form of a bevel pinion 44, is formed on, or is connected to, the input element 28. Accordingly, rotational input is delivered into the case 36 through the input element 28 including the bevel pinion 44. A bevel gear 46 is rotationally disposed inside the case 36 and is supported on bearings 48, which are journaled on the output element 32. The bevel pinion 44 and the bevel gear 46 form a bevel gearset 49 that transfers rotational torque from rotation around the axis 50 of the input element 28 to rotation around the axis 52 of the output element 32. The axis 52 defines an axial direction 54 which is bi-directional and is parallel to, or coextensive with, the axis 52.

In the example of FIGS. 2 and 3, the output element 32 extends completely through the case 34 and is rotationally supported on the case 34 by bearings 56 and 58. The output element 32 includes internal splines for connection with external splines of the knotter shaft 62 that is coupled with the knotter assembly 18, such the power flows through the mating splines 60 from the output element 32 to the knotter shaft 62. A splined coupler 64, generally in the shape of a hollow cylinder, is received over the output element 32 between the bearings 56 and 58. The splined coupler 64 is fixed in position on the output element 32 by mating splines 68 that extend in the axial direction 54. An engagement element (or first or driving engagement element) 72 includes an end 74 fixed to the bevel gear 46. The engagement element 72 includes an end 78 opposite the end 74. The end 78 forms a gear element 80 with external teeth or splines, terminal axial ends of which may be tapered or otherwise have camming surfaces to ease engagement. The gear element 80 rotates in concert with the input element 28 and the bevel gear 46. In the example of the baler 10 towed by the tractor 12, the PTO 14 drives these three elements (28, 46, 72) to rotate continuously when the tractor 12 and baler 10 are in operation and the PTO 14 is engaged, such that they may all be considered part of the power input to the drive system 22, in other words, they are all input components.

Rotation and drive torque are intermittently delivered to the output element 32 through a synchronizing ring 82. The synchronizing ring 82 is generally annular in shape and is mounted on the output element 32, in the present example through the splined coupler 64. The synchronizing ring 82 is connected by mating splines 70 to rotate with the output element 32 and the splined coupler 64, and is slidable in the axial direction 54 relative to the output element 32 along the splines 70. The synchronizing ring 82 includes an annular shaped body 84 with a countersink 86 formed on its side 88 facing the bevel gear 46, creating an inside diameter having a surface 90 facing inward toward the axis 52 opposite from an outside diameter of the synchronizing ring 82. An engagement element (or second or driven engagement element) 92 is formed on the surface 90 and is engageable with the engagement element 72. Specifically, the surface 90 includes a gear element 94 with teeth or splines that are configured to mesh with the teeth or splines of the gear element 80. Terminal ends of the teeth or splines in the gear element 94 may be tapered or otherwise have camming surfaces to ease engagement with the teeth or splines of the gear element 80. As noted above, the synchronizing ring 82 is slidable on the splined coupler 64 in the axial direction 54. When the synchronizing ring 82 slides toward the bevel gear 46, the gear element 94 meshes with the gear element 80 as shown in FIG. 4, so that the engagement element 92 is engaged with the engagement element 72. As a result, the output element 32 is coupled to the input element 28 through the bevel gearset 49, the engagement elements 72, 92, the synchronizing ring 82 and the splined coupler 64, which forms a power path through the drive unit 26. As shown in FIG. 3, when the synchronizing ring 82 slides away from the bevel gear 46, the gear element 94 no longer meshes with the gear element 80, so that the engagement elements 72, 92 are disengaged, and the power path is broken with the output element 32 decoupled from the input element 28.

Engagement between the engagement elements 72, 92 is controlled by a decoupling ring 96. The decoupling ring 96 is annular in shape and is disposed around the output element 32 adjacent the bevel gear 46. In the current example, the decoupling ring 96 is supported on the bevel gear 46 and the engagement element 72 through a bearing 98. As a result, the bevel gear 46 and the engagement element 72 may rotate relative to the decoupling ring 96. Accordingly, the decoupling ring 96 is not required to rotate with the input element 28. The decoupling ring 96 is fixed in the axial direction 54 on the bearing 98.

With additional reference to FIG. 5, the decoupling ring 96 has an outer perimeter 100 with a lug 102 projecting radially outward from the outer perimeter 100 in a direction away from the axis 52. A trigger 106 is disposed in the case 34 and pivots on a shaft 106. The shaft 106 extends out of the case 34 and is connected with the actuator arm 30. In response to movement of the actuator arm 30, the trigger 104 is moved between engagement with the lug 102 as shown in FIG. 5 and disengagement from the lug 102 as shown in FIG. 6. When the trigger 104 is engaged with the lug 102, the decoupling ring 96 is held from rotating and therefore, the input element 28 rotates while the decoupling ring 96 does not. When the actuator arm 30 is actuated, the shaft 106 is rotated and the trigger 104 is moved to the position of FIG. 6 where the trigger is disengaged from the lug 102. The allows the decoupling ring 96 to rotate. As shown in FIG. 3, a thrust ring 108 of wear resistant material is positioned between the bevel gear 46 and the decoupling ring 96. When the decoupling ring 96 is held from rotating by the trigger 104, the thrust ring 108 allows sliding motion between the bevel gear 46 and the decoupling ring 96. When the trigger 104 releases the decoupling ring 96, the thrust ring 108 imparts rotational effort from the bevel gear 46 to the decoupling ring 96 so that the decoupling ring rotates with the input element 28. To assist in imparting rotation, the thrust ring 108 may include a friction material surface in some examples.

The decoupling ring 96 effects coupling and decoupling of the power path between the input element 28 and the output element 32 in response to actuation of the trigger 104 and through interaction with the synchronizing ring 82. With additional reference to FIGS. 7-10, the decoupling ring 96 includes decoupling features, which in the illustrated example take the form of a cam surface or ramp 110, and the synchronizing ring 82 includes decoupling features at an end face between the inner and outer diameters of the synchronizing ring, which in the illustrated example, are in the form of a complementary-shaped cam surface or ramp 112 that is shaped to mate with the ramp 110. The ramp 110 includes a ramp surface 114 facing in the axial direction 54 toward the synchronizing ring 82 and the ramp 112 includes a ramp surface 116 facing in the axial direction 54 toward the decoupling ring 96. The decoupling ring 96 and/or the synchronizing ring 82 may have multiple ramps 110, 112 respectively, formed around their circumference to distribute loads around the rings. An engage spring 115 (e.g. a group of alternating conical springs) is coupled to the splined coupler 64 (e.g., via a snap ring (not shown)) and a second spring 117 (e.g., one or more conical springs) is compressed between the case 34 and the synchronizing ring 82, collectively these springs 115, 117 biasing the synchronizing ring 82 toward the decoupling ring 96. This also forces the decoupling ring 96 against the thrust ring 108, helping maintain the decoupling ring 96 in a fixed axial position. The engage spring 115 also provides an axial force tending to mate the teeth or splines of the engagement element 92 and the engagement element 72. The spring 115 also aids in controlling the frictional content of the synchronizing ring 82 to help impart a rotational difference of the synchronizing ring 82 with respect to the decoupling ring 96.

Operation of the ramps 110, 112 in coupling and decoupling the drive system 22 will be described with ongoing reference to FIGS. 7-10. The ramp 110 includes an end 118, which is the part of the ramp 110 that projects toward the synchronizing ring 82 the least distance in the axial direction. The ramp 110 includes an end 120, which is the part of the ramp 110 that projects toward the synchronizing ring 82 the greatest distance in the axial direction. The ramp 112 includes an end 122, which is the part of the ramp 112 that projects toward the decoupling ring 96 the greatest distance in the axial direction. The ramp 112 includes an end 124, which is the part of the ramp 112 that projects toward the decoupling ring 96 the greatest distance in the axial direction. With the trigger 104 engaged with the lug 102 as shown in FIG. 5 so that the decoupling ring 96 is held from rotation, the end 122 of the ramp 112 is positioned against the end 118 of the ramp 110, as shown in FIG. 7. This forces the synchronizing 82 ring away from the decoupling ring 96 compressing the springs 115, 117 and forming a gap 126 so that the engagement elements 72, 92 are disengaged, as shown in FIG. 3. When the actuator 18 releases the trigger 104 from the lug 102 through movement of the actuator arm 30 and the shaft 106, the decoupling ring 96 is allowed to rotate under input from the bevel gear 46 through the thrust ring 108. As the decoupling ring 96 starts to rotate while the synchronizing ring 82 is not rotating, the ramped surface 114 slides along the ramp surface 116, as shown in FIG. 8. The gap 126 is reduced as the engagement elements 72, 92 engage with the gear element 94 meshing with the gear element 80, and the synchronizing ring 82 is driven to rotate by the engagement element 72. As the synchronizing ring 82 slides along the output element 32, and specifically on the splined coupler 64, the engage spring 115 is decompressed. The engagement elements 72, 92 fully engage, and, as shown in FIG. 9, the end 122 of ramp 112 registers with the end 118 of ramp 110. As a result, the input element 28 is coupled with the output element 32 and rotates therewith, as shown in FIGS. 3A and 4.

Figure 3A:
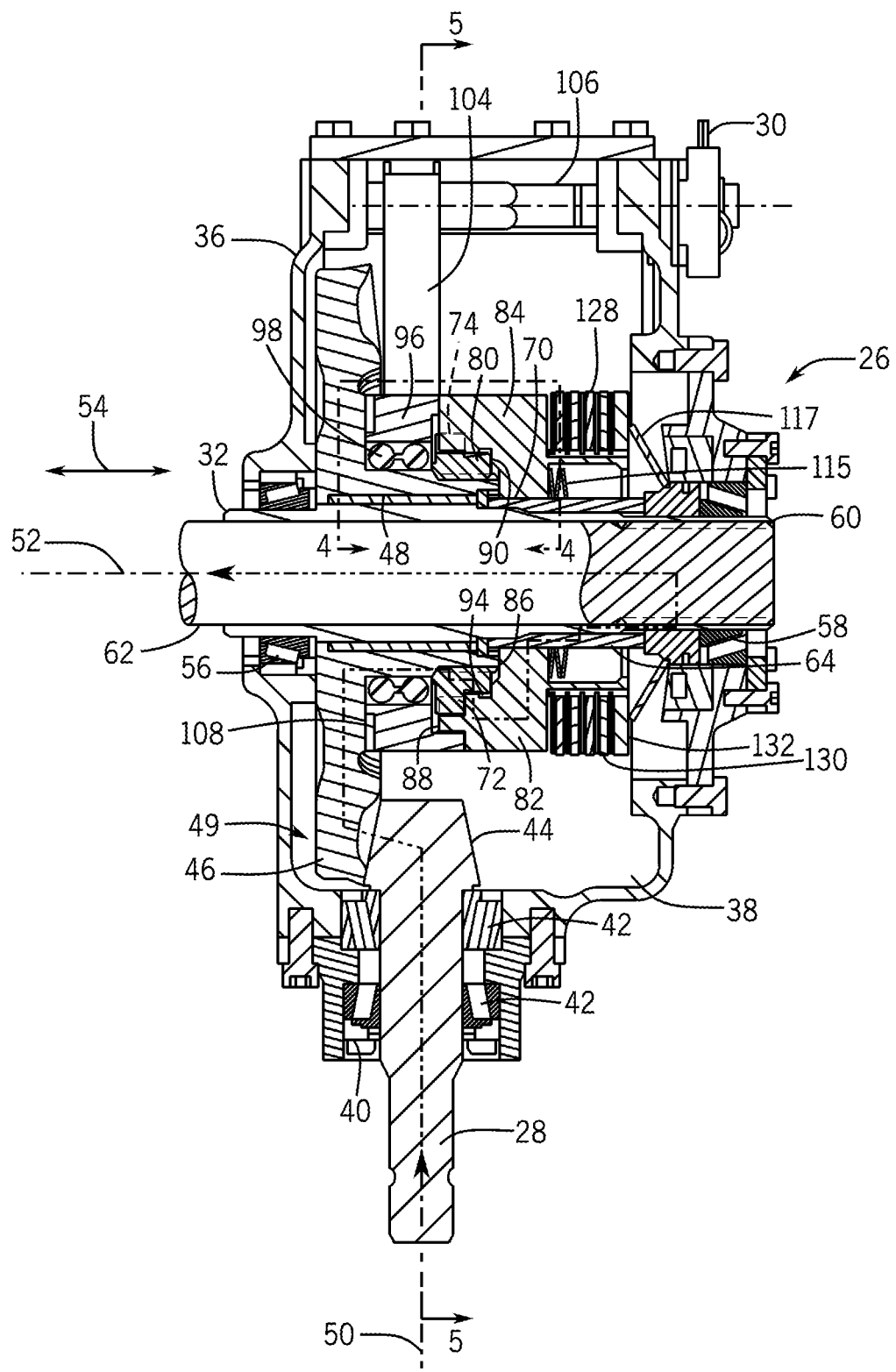
FIG. 3A is sectional illustration of the drive unit taken along line 3-3 of FIG. 2, in a coupled state.

The power flow from the input element 28 to the knotter shaft 62 is shown by the dot-dash path in FIG. 3A during the intermittent coupling thereof. As can be seen, rotational power flows through the input element 28 to the bevel gear 46 through its coupling with the bevel pinion 46. The bevel gear 46 rotates the engagement element 72 to which it is splined. The gear element 80 of the engagement element 72 meshes with the engagement element 92/gear element 94 of the synchronizer ring 82, which is splined to the output element 32 by the splined coupler 64. The output element 32 in turn rotates the knotter shaft 62 through the mating splines 60.

The trigger 104 is biased toward the decoupling ring 96 so that once the lug 102 clears the trigger 104, the trigger 104 is positioned against the decoupling ring 96 so that when one revolution is complete, the lug 102 reengages the trigger 104 and the decoupling ring 96 is again stopped from rotating, as shown in FIG. 5. Disengagement of the engagement elements 72, 92 and therefore, disengagement of the output element 32 from the input element 28 is initiated by stopping rotation of the decoupling ring 96. When the decoupling ring 96 is stopped, the synchronizing ring 82 initially continues to rotate under operation of the engaged engagement elements 72, 92. Stopping rotation of the decoupling ring 96 drives the synchronizing ring 82 in the axial direction 54 via the ramps 110, 112. As shown in FIG. 10, the ramp surface 116 slides along the ramp surface 114 forcing the synchronizing ring 82 away from the decoupling ring 96 and reopening the gap 126. As the gap 126 widens, the engagement elements 72, 92 disengage, as shown in FIG. 3, and as the synchronizing ring returns to the position of FIG. 7, the synchronizing ring 82 stops rotation at the same rotational position at which it began moving. Accordingly, the output element 32 makes one revolution per actuation of the trigger 104. In some embodiments, the output element 32 may be rotated intermittently an amount other than a single revolution by providing multiple lugs 102 such as for a fraction of a rotation, or by holding the trigger 104 disengaged from the decoupling ring 96 by the actuator 24 such as for a selected number of rotations. In other embodiments, any preferred amount of rotation may be provided through a combination of lugs 102 and actuation of the trigger 104. Through the ramps 110, 112, a soft decoupling is provided which avoids impact shocks and force spikes in the drive system 22 as the decoupling ring 96 comes to an abrupt stop. Disengagement using the ramps 110, 112 avoids binds as the engagement elements 72, 92 disengage under load.

In a number of examples, the drive unit 26 includes a brake 128, where decoupling action of the drive system 22 applies the brake 128. A number of brake disks 130 are positioned axially between the synchronizing ring 82 and a stop 132. The synchronizing ring 82 includes an annular extension 124 that extends in the axial direction 54 through the brake discs 130, which are also annular in shape. In this example, the stop 132 is in the form of an annular plate disposed on annular extension 124. Axial movement of the stop 132 is restricted, such as by the case 34. When the synchronizing ring 82 moves axially toward the stop 132 under operation of the ramps 110 and 112, the brake 128 is incrementally applied to slow the synchronizing ring 82, the output element 32, and the connected components. In applications such as the baler 10, where large heavy components of the knotter assembly 18 are driven to move, the brake 128 provides a mechanism to slow movement as the engagement elements 72, 92 operate through disengagement. When the drive system 22 is decoupled, free rotation of the synchronizing ring 82 is prevented by the brake 128. In a number of examples, by holding the synchronizing ring 82, the brake 128 holds the output element 32 in position when the engagement elements 72, 92 are disengaged, which holds the connected components such as the knotter assembly 18 in its starting position. The brake 128 is set in the reservoir 38 and, therefore, protected by the case 34 and lubricated by the contained lubrication oil.

In some embodiments, the synchronizing ring 82 may have one engagement orientation or a discrete number of engagement orientations per revolution in which the synchronizing ring 82 is synchronized with the decoupling ring 96. The synchronizing ring 82 and the decoupling ring 96 may be required to be in the one engagement orientation (or discrete number of engagement orientations) to be properly oriented so that the teeth or splines of the gear element 80 may align and engage with teeth or splines of the gear element 94. With reference to FIG. 4A, in the illustrated example, the synchronizing ring 82 has a single alignment lug 134 that is configured to mate with a single alignment recess 136 in the engagement element 72, thus requiring a single engagement orientation of the synchronizing ring 82. Thus, for the gap 126 to be closed, the alignment lug 134 must align with the alignment recess 136. Of course, if additional, equally spaced and configured alignment features were included, the synchronizing ring 82 and the engagement element 72 could be rotated into other engagement orientations. For example, if the assembly included a second pairing of alignment lug and recess of the same configuration at angularly spaced 180 degrees from the alignment lug 134 and alignment recess 136, then coupling could occur in either of two engagement orientations, and so for additional alignment pairings of the same shape with equal angular spacings. In addition to quantity, it should be noted that the configuration and the male-female orientation of the alignment features could different, for example, with the alignment lug being located on the engagement element 72 and the alignment recess being located in the synchronizing ring 82. Moreover, in other configurations it is possible for either alignment feature to be made a part of the decoupling ring 96 rather than the engagement element 72.

As described above, in the illustrated example, the decoupling ring 96 is held rotationally fixed until the trigger 104 is disengaged, and the synchronizing ring 82 may be held rotationally fixed until the brake 128 is released. The trigger 104 and the brake 128 may be actuated to release the decoupling ring 96 and the synchronizing ring 82 simultaneously or sequentially. Upon release, the decoupling ring 96 will begin to rotate up to the input speed (and may or may not reach it), and the synchronizing ring 82, which is biased by the springs 115, 117 toward and in contact with the now rotating decoupling ring 96, will begin to rotate as well. To facilitate registration of the alignment features 134, 136, some relative rotation between the alignment features 134, 136 will occur so that the synchronizing ring 82 may index or rotate slightly until the alignment features 134, 136 align and mate. This relative rotational difference may occur naturally in the example embodiment in which the alignment features are located in one continuously rotating part (e.g., the engagement element 72) and one intermittently rotating part (e.g., the synchronizing ring 82). Even so, and in other embodiments in which the alignment features are both located in intermittently rotating components (e.g., in the decoupling ring 96 and the synchronizing ring 82), relative rotation or indexing between the alignment features may be encouraged by controlling the timing in which the brake 128 is released relative to the release of the trigger 104 (e.g., by slightly delaying brake release) and/or applying a certain frictional load tending to resist rotation by the synchronizing ring 82, which, in either case, would affect the rotational speed of the synchronizing ring 82 relative to the decoupling ring 96. Mechanical features, such as spring 117, can impart a different frictional load on the synchronizing ring 82, and thereby the time by which the synchronizing ring 82 will speed up, which will effect a relative rotation with respect to the engagement element 72 or the decoupling ring 96 as the case may be.

Through the examples described above, a drive system includes a rotating input element and an output element that is alternatively coupled with the input element to rotate therewith or is decoupled from the input element to not rotate therewith, through operation of a decoupling bring and a synchronizing ring. Rotation of the output element is timed to an operation of the machine within which the drive system transmits power. The output element begins rotating and stops at the same rotational position. Intermittent power transmission is provided in single rotation increments, or in other increments. Coupling of power from the input to the output through the synchronizer clutch is established only upon two conditions being met, namely, the cooperative alignment of the alignment features, and cooperative alignment of the decoupling features. With the alignment features mated, the peaks of the teeth or splines of the engagement element align with the valleys between the teeth or splines of the synchronizing ring. Then, with the decoupling features oriented so that ramps slide into contact with one another, the teeth and splines are slid axially and intermeshed within each other. This two-step or two-key arrangement ensures proper indexing and engagement of the mating teeth or splines during coupling of the input to the output by the synchronizer clutch.

Also, the following examples are provided, which are numbered for easier reference.

1. An intermittent drive system including: a rotatable output component; a rotating input component including a driving engagement element; a synchronizer including a synchronizing ring coupled to the output element to rotate therewith, the synchronizing ring having a driven engagement element configured to selectively engage with the driving engagement element, the synchronizing ring having an alignment feature configured to rotationally align the driving engagement element with the driven engagement element and having a decoupling feature configured to selectively disengage the driving engagement element from the driven engagement element; and a decoupling ring selectively coupled to the input component, the decoupling ring having a decoupling feature configured to selectively engage with the decoupling feature of the synchronizing ring; wherein the driving engagement element engages the driven engagement element only when both the alignment feature is rotationally oriented to align the driving engagement element with the driven engagement element and the decoupling features are rotationally oriented to allow the driving engagement element to engage the driven engagement element.

2. The intermittent drive system of example 1, wherein the synchronizer is configured so that the driving engagement element and the driven engagement element engage and disengage within a single rotation of the output component.

3. The intermittent drive system of example 1, wherein the synchronizing ring has an inside diameter and an outside diameter; and wherein the driven engagement element is a set of teeth or splines arranged along the inside diameter, the alignment feature is one or more lugs or recesses located between the inside diameter and the outside diameter, and the decoupling feature is one or more ramp surfaces located between the inside diameter and the outside diameter.

4. The intermittent drive system of example 1, wherein the synchronizer further includes a decoupling ring having a decoupling feature configured to mate with the decoupling feature of the synchronizing ring.

5. The intermittent drive system of example 4, wherein the decoupling features of the synchronizing ring and the decoupling ring are matable ramp surfaces.

6. The intermittent drive system of example 5, wherein the ramp surfaces are configured to disengage the driven engagement element from the drive engagement element by the ramp surfaces sliding against one another to move the synchronizing ring away from the decoupling ring.

7. The intermittent drive system of example 4, wherein the synchronizing ring is movable along an axis of rotation and rotatable about the axis of rotation with respect to the decoupling ring when the driving engagement element and the driven engagement element are engaged and disengaged; and further including a spring biasing the synchronizing ring toward the decoupling ring.

8. The intermittent drive system of example 4, further including a brake that inhibits rotation of the synchronizing ring.

9. The intermittent drive system of example 4, wherein the decoupling ring has a lug that when engaged inhibits rotation of the decoupling ring and coupling of the driving engagement member with the driven engagement member.

10. The intermittent drive system of example 9, further include a trigger selectively engageable with the lug of the decoupling ring; wherein when the lug is released by the trigger, the synchronizing ring and the output element rotate through a single rotation per actuation of the trigger; and wherein for the single rotation, the output element begins at a rotational position and ends at the rotational position.

11. The intermittent drive system of example 1, wherein the input component includes an alignment feature that is matable with alignment feature of the synchronizing ring;

and wherein the alignment features of the input component and the synchronizing ring are one or more matable lug and recess arrangements.

12. An intermittent drive system comprising: an input element configured to rotate; a first engagement element coupled with the input element to rotate therewith; a decoupling ring selectively rotatable with the input element, the decoupling ring including a first ramp surface; an output element alternatively coupled with the input element to rotate therewith, or decoupled from the input element to not rotate therewith; a synchronizing ring coupled with the output element to rotate therewith and configured to slide relative to the output element, the synchronizing ring including a second ramp surface facing the first ramp surface, and the synchronizing ring including a second engagement element engageable with the first engagement element; and a trigger engageable with the decoupling ring to hold the decoupling ring from rotating and actuatable to release the decoupling ring to rotate with the input element; wherein the first and second ramp surfaces are configured to disengage the second engagement element from the first engagement element when the trigger holds the decoupling ring from rotating, thereby decoupling the output element from the input element; wherein the synchronizing ring is configured to slide toward the decoupling ring when the trigger is actuated, thereby enabling the second engagement element to engage with the first engagement element so that the output element is coupled to rotate with the input element through the synchronizing ring.

13. The intermittent drive system of example 12, wherein the first and second ramp surfaces are configured to disengage the second engagement element from the first engagement element by the first and second ramp surfaces sliding against one another to move the synchronizing ring away from the decoupling ring when the trigger engages the decoupling ring.

14. The intermittent drive system of example 13, wherein the decoupling ring is configured so that when released by the trigger to rotate, the synchronizing ring and the output element rotate through a single rotation per actuation of the trigger; and wherein for the single rotation, the output element begins at a rotational position and ends at the rotational position; further comprising a lug on the decoupling ring that is engageable with the trigger to stop rotation of the decoupling ring.

15. The intermittent drive system of example 12, wherein the decoupling ring has a first alignment feature and the synchronizing ring has a second alignment feature configured to mate with the first alignment feature to rotationally align the first engagement element with the second engagement element.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An intermittent drive system comprising:
a rotatable output component;
a rotating input component including a driving engagement element;
a synchronizer including a synchronizing ring coupled to the output element to rotate therewith, the synchronizing ring having a driven engagement element configured to selectively engage with the driving engagement element, the synchronizing ring having an alignment feature configured to rotationally align the driving engagement element with the driven engagement element and having a decoupling feature configured to selectively disengage the driving engagement element from the driven engagement element; and
a decoupling ring selectively coupled to the input component, the decoupling ring having a decoupling feature configured to selectively engage with the decoupling feature of the synchronizing ring;
wherein the driving engagement element engages the driven engagement element only when both the alignment feature is rotationally oriented to align the driving engagement element with the driven engagement element and the decoupling features are rotationally oriented to allow the driving engagement element to engage the driven engagement element.

2. The intermittent drive system of claim 1, wherein the synchronizer is configured so that the driving engagement element and the driven engagement element engage and disengage within a single rotation of the output component.

3. The intermittent drive system of claim 1, wherein the synchronizing ring has an inside diameter and an outside diameter; and
wherein the driven engagement element is a set of teeth or splines arranged along the inside diameter, the alignment feature is one or more lugs or recesses located between the inside diameter and the outside diameter, and the decoupling feature is one or more ramp surfaces located between the inside diameter and the outside diameter.

4. The intermittent drive system of claim 1, wherein the decoupling features of the synchronizing ring and the decoupling ring are matable ramp surfaces.

5. The intermittent drive system of claim 4, wherein the ramp surfaces are configured to disengage the driven engagement element from the drive engagement element by the ramp surfaces sliding against one another to move the synchronizing ring away from the decoupling ring.

6. The intermittent drive system of claim 1, wherein the synchronizing ring is movable along an axis of rotation and rotatable about the axis of rotation with respect to the decoupling ring when the driving engagement element and the driven engagement element are engaged and disengaged; and
further including a spring biasing the synchronizing ring toward the decoupling ring.

7. The intermittent drive system of claim 1, further including a brake that inhibits rotation of the synchronizing ring.

8. The intermittent drive system of claim 1, wherein the decoupling ring has a lug that when engaged inhibits rotation of the decoupling ring and coupling of the driving engagement member with the driven engagement member.

9. The intermittent drive system of claim 8, further include a trigger selectively engageable with the lug of the decoupling ring;
wherein when the lug is released by the trigger, the synchronizing ring and the output element rotate through a single rotation per actuation of the trigger; and
wherein for the single rotation, the output element begins at a rotational position and ends at the rotational position.

10. The intermittent drive system of claim 1, wherein the input component includes an alignment feature that is matable with alignment feature of the synchronizing ring; and
wherein the alignment features of the input component and the synchronizing ring are one or more matable lug and recess arrangements.

11. The intermittent drive system of claim 1, wherein the decoupling features of the synchronizing ring and decoupling ring are configured to force the synchronizing ring and the decoupling ring apart in the axial direction when there is relative rotation between the synchronizing ring and the decoupling ring.

12. The intermittent drive system of claim 11, wherein at least one of the decoupling features includes an axially extending element which creates the separating force between the synchronizing ring and the decoupling ring.

13. An intermittent drive system comprising:
an input element configured to rotate;
a first engagement element coupled with the input element to rotate therewith;
a decoupling ring selectively rotatable with the input element, the decoupling ring including a first ramp surface;
an output element alternatively coupled with the input element to rotate therewith, or decoupled from the input element to not rotate therewith;
a synchronizing ring coupled with the output element to rotate therewith and configured to slide relative to the output element, the synchronizing ring including a second ramp surface facing the first ramp surface, and the synchronizing ring including a second engagement element engageable with the first engagement element; and
a trigger engageable with the decoupling ring to hold the decoupling ring from rotating and actuatable to release the decoupling ring to rotate with the input element;
wherein the first and second ramp surfaces are configured to disengage the second engagement element from the first engagement element when the trigger holds the decoupling ring from rotating, thereby decoupling the output element from the input element;
wherein the synchronizing ring is configured to slide toward the decoupling ring when the trigger is actuated, thereby enabling the second engagement element to engage with the first engagement element so that the output element is coupled to rotate with the input element through the synchronizing ring.

14. The intermittent drive system of claim 13, wherein the first and second ramp surfaces are configured to disengage the second engagement element from the first engagement element by the first and second ramp surfaces sliding against one another to move the synchronizing ring away from the decoupling ring when the trigger engages the decoupling ring.

15. The intermittent drive system of claim 14, wherein the decoupling ring is configured so that when released by the trigger to rotate, the synchronizing ring and the output element rotate through a single rotation per actuation of the trigger; and
wherein for the single rotation, the output element begins at a rotational position and ends at the rotational position.

16. The intermittent drive system of claim 15, further comprising a lug on the decoupling ring that is engageable with the trigger to stop rotation of the decoupling ring.

17. The intermittent drive system of claim 13, wherein the input element comprises an input shaft; and further comprising:
a bevel pinion fixed to rotate with the input shaft; and
a bevel gear meshing with the bevel pinion;
wherein the first engagement element is fixed to rotate with the bevel gear.

18. The intermittent drive system of claim 13, wherein the first engagement element is an annular gear and the second engagement element is a gear element fixed to rotate with the synchronizing ring, the annular gear and the gear element configured to mesh with one another.

19. The intermittent drive system of claim 13, wherein the decoupling ring has a first alignment feature and the synchronizing ring has a second alignment feature configured to mate with the first alignment feature to rotationally align the first engagement element with the second engagement element.

20. The intermittent drive system of claim 19, wherein the synchronizing ring has an inside diameter and an outside diameter; and
wherein the second engagement element is arranged along the inside diameter, the second alignment feature is located between the inside diameter and the outside diameter, and the first and second ramp surfaces are located between the inside diameter and the outside diameter.

* * * * *